US012659757B2

(12) United States Patent
Lee et al.

(10) Patent No.: US 12,659,757 B2
(45) Date of Patent: Jun. 16, 2026

(54) METHOD AND APPARATUS FOR BEAM MANAGEMENT IN MOBILE COMMUNICATIONS

(71) Applicant: MediaTek Inc., Hsinchu City (TW)

(72) Inventors: Wan-Chi Lee, Hsinchu City (TW);
Gyu Bum Kyung, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 330 days.

(21) Appl. No.: 18/427,904

(22) Filed: Jan. 31, 2024

(65) Prior Publication Data

US 2024/0267750 A1 Aug. 8, 2024

Related U.S. Application Data

(60) Provisional application No. 63/483,774, filed on Feb. 8, 2023.

(51) Int. Cl.
*H04W 16/28* (2009.01)
*H04B 7/06* (2006.01)
*H04W 24/10* (2009.01)

(52) U.S. Cl.
CPC ........ *H04W 16/28* (2013.01); *H04B 7/06952* (2023.05); *H04W 24/10* (2013.01)

(58) Field of Classification Search
CPC ...... H04W 24/10; H04W 16/28; H04B 7/088; H04B 7/06952; H04B 7/0695
See application file for complete search history.

(56) References Cited

U.S. PATENT DOCUMENTS

| | | | | |
|---|---|---|---|---|
| 11,019,664 B2 * | 5/2021 | Choi | ...................... | H04B 7/088 |
| 11,877,275 B2 * | 1/2024 | Kim | ...................... | H04L 5/0051 |
| 2021/0159963 A1 * | 5/2021 | Akkarakaran | ........ | H04L 1/1607 |
| 2021/0211329 A1 * | 7/2021 | Wu | ...................... | H04L 25/0226 |
| 2022/0248246 A1 * | 8/2022 | Berliner | .............. | H04B 7/0617 |
| 2022/0394504 A1 * | 12/2022 | Guan | .................... | H04L 5/0051 |
| 2023/0262506 A1 * | 8/2023 | Yang | ..................... | H04W 24/10 370/252 |
| 2023/0283352 A1 * | 9/2023 | Mu | .................... | H04B 7/06952 375/267 |
| 2023/0421224 A1 * | 12/2023 | Lee | ........................ | G01S 5/0205 |
| 2024/0129870 A1 * | 4/2024 | Kim | ..................... | H04B 7/0617 |
| 2024/0137887 A1 * | 4/2024 | Jeong | ................ | H04W 56/0045 |
| 2024/0372600 A1 * | 11/2024 | Schreck | .............. | H04B 7/0456 |
| 2025/0007579 A1 * | 1/2025 | Alkhateeb | ............ | H04B 7/0617 |
| 2025/0048130 A1 * | 2/2025 | Sun | ...................... | H04W 16/28 |
| 2025/0150119 A1 * | 5/2025 | Lee | ...................... | H04B 17/309 |
| 2025/0211309 A1 * | 6/2025 | Sheng | ................ | H04B 7/06952 |
| 2025/0260466 A1 * | 8/2025 | Li | ...................... | H04B 7/06952 |
| 2025/0350341 A1 * | 11/2025 | Kwak | ..................... | H04L 41/16 |

* cited by examiner

*Primary Examiner* — Syed Ali
(74) *Attorney, Agent, or Firm* — Andy M. Han; Han IP PLLC

(57) ABSTRACT

Examples pertaining to beam management in mobile communications are described. A user equipment (UE) determines a beam pattern according to at least one of an optimal beam in a previous inference, a beam in use, a previous measurement result and a condition of a channel between the apparatus and a network node. The UE provides information regarding the beam pattern to the network node.

12 Claims, 7 Drawing Sheets

600

DETERMINE, BY A PROCESSOR OF AN APPARATUS, A BEAM PATTERN ACCORDING TO AT LEAST ONE OF AN OPTIMAL BEAM IN A PREVIOUS INFERENCE, A BEAM IN USE, A PREVIOUS MEASUREMENT RESULT AND A CONDITION OF A CHANNEL BETWEEN THE APPARATUS AND A NETWORK NODE
610

PROVIDE, BY THE PROCESSOR, INFORMATION REGARDING THE BEAM PATTERN TO THE NETWORK NODE
620

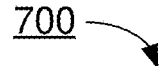
700

DETERMINE, BY A PROCESSOR OF AN APPARATUS,  A BEAM PATTERN
ACCORDING TO AT LEAST ONE OF AN OPTIMAL BEAM IN A PREVIOUS
INFERENCE, A TRANSMISSION BEAM IN USE, A MEASUREMENT
RESULT OBTAINED FROM A USER EQUIPMENT (UE) AND A CONDITION
OF A CHANNEL BETWEEN THE APPARATUS AND THE UE
710

TRANSMIT, BY THE PROCESSOR, A MEASUREMENT CONFIGURATION
COMPRISING INFORMATION REGARDING THE BEAM PATTERN TO THE
UE
720

FIG. 7

METHOD AND APPARATUS FOR BEAM MANAGEMENT IN MOBILE COMMUNICATIONS

CROSS REFERENCE TO RELATED PATENT APPLICATION(S)

The present disclosure is part of a non-provisional application claiming the priority benefit of U.S. patent Application No. 63/483,774, filed 8 Feb. 2023, the content of which herein being incorporated by reference in its entirety.

TECHNICAL FIELD

The present disclosure is generally related to mobile communications and, more particularly, to efficient beam management in mobile communications.

BACKGROUND

Unless otherwise indicated herein, approaches described in this section are not prior art to the claims listed below and are not admitted as prior art by inclusion in this section.

In new generation communication systems (e.g., a fifth-generation (5G) network, or a New Radio (NR) network), high frequency bands (e.g., millimeter wave) transmission may become more popular and may be necessary for high data rate requirements. In high frequency band transmission, it is unavoidable to use an antenna array for transmitting signals. One characteristic of the antenna array is that the radiation beam of which can be narrow and points to a specific direction.

Beam sweeping is a technique to transmit beams in predefined directions in a regular interval. The user equipment (UE) measures received power of the beams and reports the measurement results to the network, to assist in finding out an optimal beam for communication. A beam management procedure usually involves the beam sweeping and beam measurement operations.

As beamforming being a key technology in the new generation communication systems, how to achieve efficient beam measurement and accurate determination of the optimal beam through beam selection in the beam management procedure becomes an important issue for the mobile communication network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to beam selection in the beam management procedure with respect to a communication apparatus (e.g., a UE) and a network apparatus (e.g., a network node or a base station (BS), such as a next generation Node B (gNB)) in mobile communications.

In one aspect, a method may involve an apparatus determining a beam pattern according to at least one of an optimal beam in a previous inference, a beam in use, a previous measurement result and a condition of a channel between the apparatus and a network node; and providing information regarding the beam pattern to the network node.

In one aspect, a method may involve an apparatus determining a beam pattern according to at least one of an optimal beam in a previous inference, a transmission beam in use, a measurement result obtained from a user equipment (UE) and a condition of a channel between the apparatus and the UE; and transmitting a measurement configuration comprising information regarding the beam pattern to the UE.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 7 is a diagram depicting another example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to beam selection to achieve efficient beam measurement and accurate determination or prediction of optimal communication beam in the beam management procedure. According to the present disclosure, a number of possible solutions may be implemented separately or jointly. That is, although these possible solutions may be described below separately, two or more of these possible solutions may be implemented in one combination or another.

Figure 1:
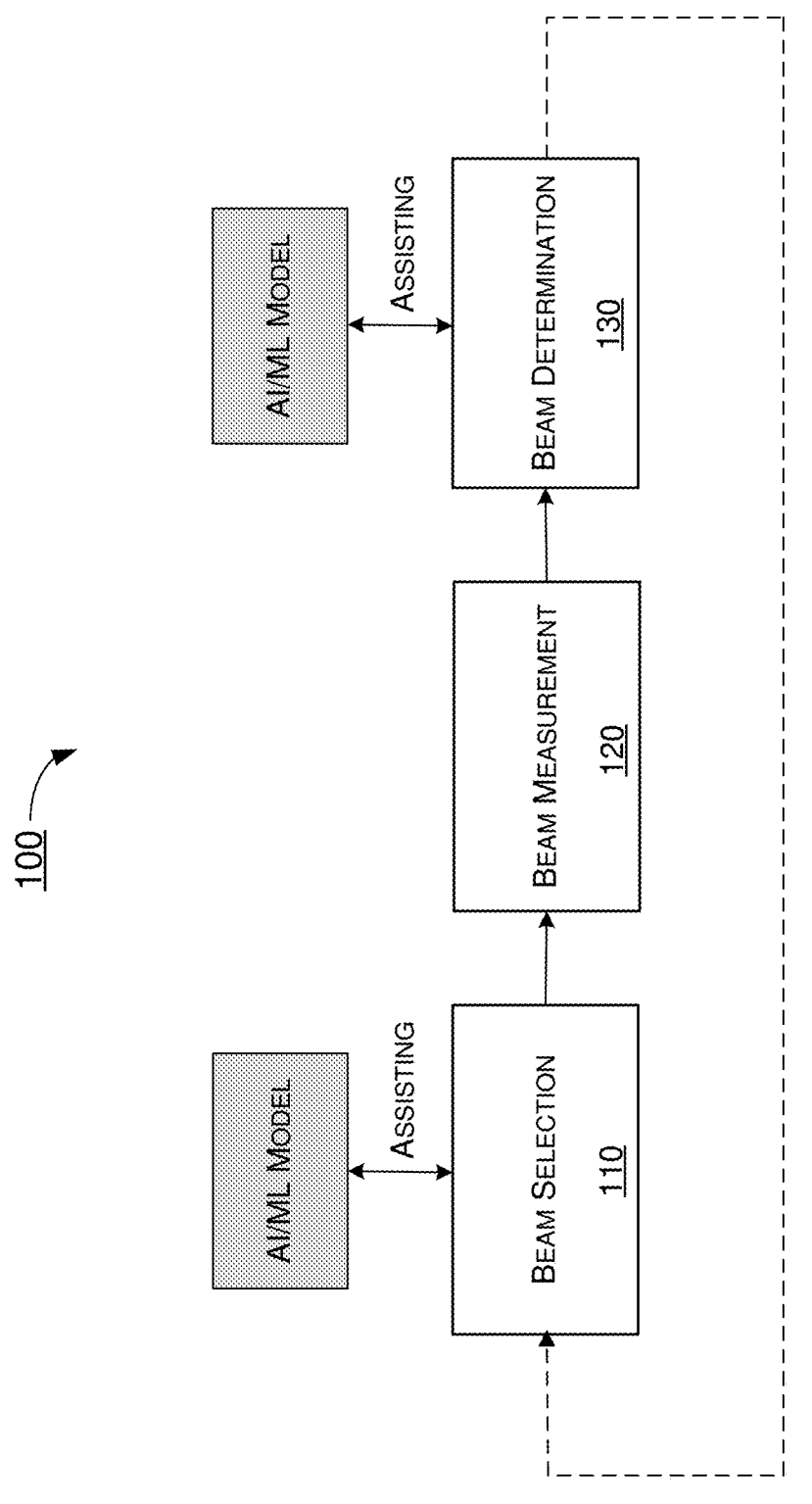
FIG. 1 is a diagram depicting an example scenario of a beam management procedure in accordance with implementations of the present disclosure.

FIG. 1 illustrates an example scenario 100 of a beam management procedure in accordance with implementations of the present disclosure. The beam management procedure may comprise several operations such as beam selection 110, beam measurement 120 and beam determination 130. In the beam selection 110, a set or a subset of beams may be selected from a plurality of predefined beams (e.g., a plurality of beams transmitted in predefined and different directions in a spatial domain). The selected beams may be configured to the communication apparatus (e.g., the UE) for measurement. In the beam measurement 120, the communication apparatus may measure the configured beams and generate a measurement result. The measurement result may comprise information regarding received power of the configured beams. In the beam determination 130, an optimal beam (or multiple preferred beams) for communication may be determined based on the measurement result. The operations of beam selection 110, beam measurement 120 or beam determination 130 may be performed once (e.g., one stage beam determination) or multiple times (e.g., multistage beam determination).

In some implementations, an artificial intelligence or machine learning model (AI/ML model) (such as a beam prediction model) may be involved in at least the beam selection 110 and/or the beam determination 130, to assist in determining one or more optimal communication beams or multiple preferred communication beams. As an example, the AI/ML model may be capable of performing an interpolation operation to obtain, estimate or infer the received power of the beams in the directions that are not measured.

Figure 2:
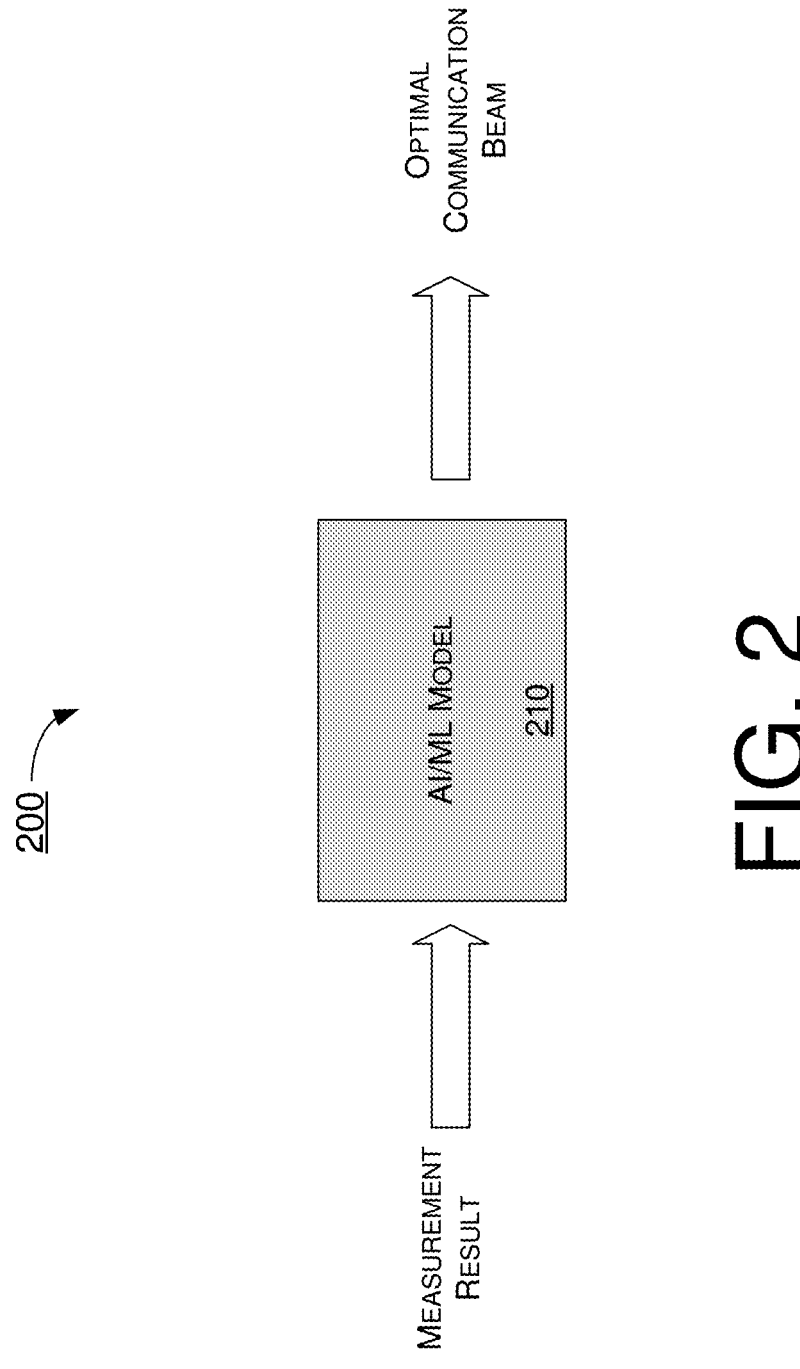
FIG. 2 is a diagram depicting an example scenario of an AI/ML model assisting in beam determination in accordance with implementations of the present disclosure.
Figure 3:
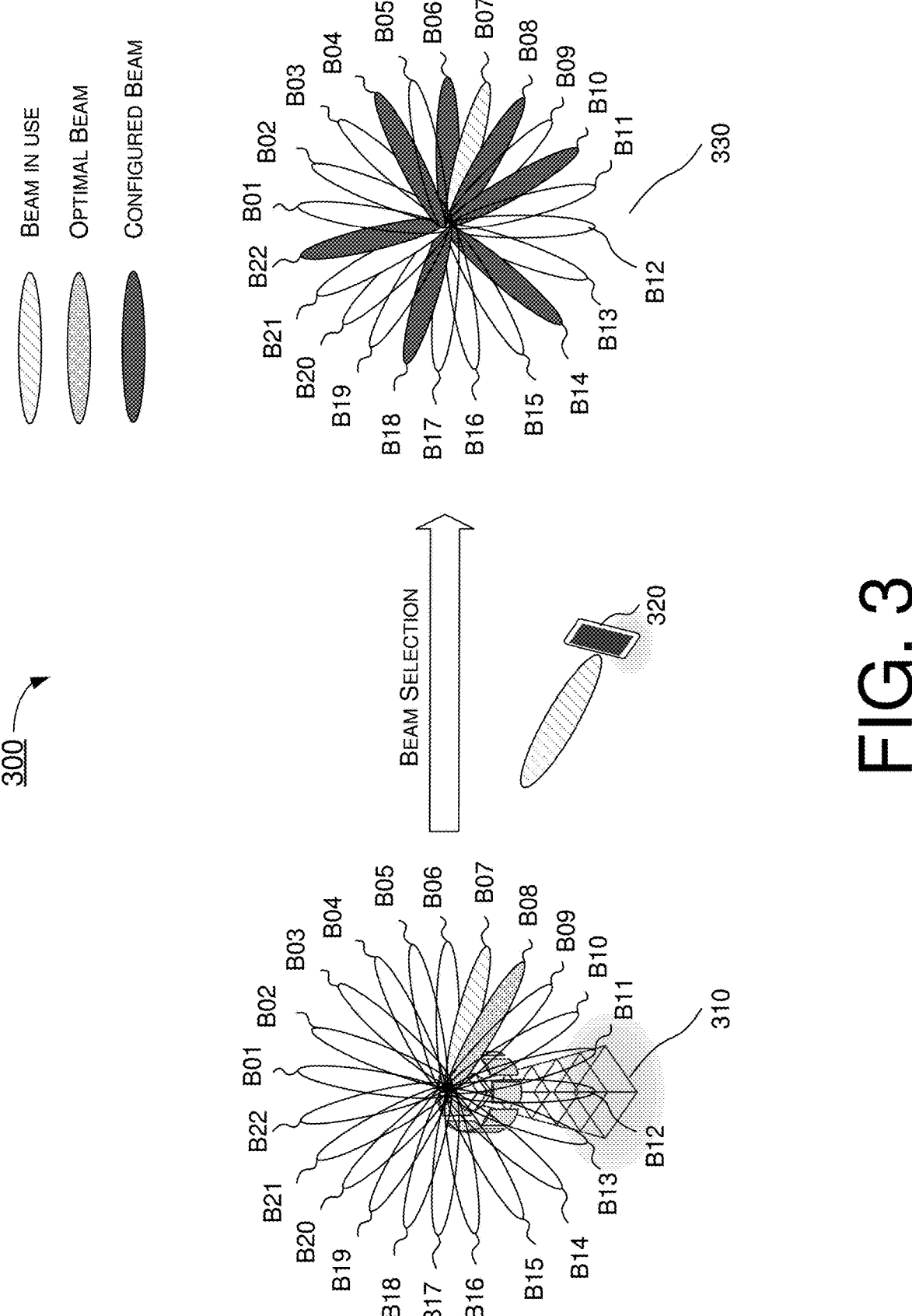
FIG. 3 is a diagram depicting an example scenario of multiple communication beams in accordance with implementations of the present disclosure.

FIG. 2 illustrates an example scenario 200 of an AI/ML model assisting in beam determination in accordance with implementations of the present disclosure. The input of the AI/ML model 210 (e.g., beam prediction model) may be the measurement result obtained in the beam measurement operations and the output of the AI/ML model 210 may be the optimal or suggested communication beam (e.g., one or more optimal/suggested beams) of the current inference. Instead of transmitting and measuring the beams in each predefined direction (as an example, a full beam pattern comprising the beams B01-B22 in each predefined direction as shown in FIG. 3) or in as many directions as possible, with the assisting of the AI/ML model, the number of selected beams (e.g., the output of the beam selection 110) and the number of configured beams to be measured may be reduced and more precise.

In addition, in some implementations, the output of beam determination 130 may be provided as a reference to further refine the scope of beam selection. For example, the beam selection 110 may be performed again based on the output of the beam determination 130.

In some implementations, an AI/ML model may also be involved in the beam selection 110, to assist in selecting the beams for measurement. The number of beams selected for measurement may be reduced and improved by utilizing the AI/ML model.

In some implementations, the beam selection with AI/ML model (e.g., the beam selection 110 in FIG. 1) may be performed by either a communication apparatus (e.g., a UE) or a network apparatus (e.g., a network node or a BS, such as a next generation Node B (gNB)) in mobile communications.

In some implementations, in the operations of beam selection, the UE may determine a beam pattern according to at least one of an optimal beam in a previous inference, a beam in use, a previous measurement result and a condition of a channel between the UE and the network node, and provide information regarding the beam pattern to the network node. In some implementations, the beam pattern may comprise a plurality of beams selected from a plurality of beams (e.g., the beams B01-B22 in FIG. 3) that can be transmitted by the network node in different directions in a spatial domain.

In some implementations, in the operations of beam selection, the network node may determine a beam pattern according to at least one of an optimal beam in a previous inference, a transmission beam in use, a measurement result obtained from the UE and a condition of a channel between the network node and the UE, and transmit a measurement configuration comprising information regarding the beam pattern to the UE. In some implementations, the beam pattern may comprise a plurality of beams selected from a plurality of transmission beams (e.g., the beams B01-B22 in FIG. 3) supported by the network node in different directions in the spatial domain.

In some implementations, the UE or the network node may densely or concentratedly select beams close to the optimal beam in the previous inference or close to the beam in use as a part of the beam pattern.

FIG. 3 illustrates an example scenario 300 of multiple communication beams in accordance with implementations of the present disclosure. The network node 310 may emit or transmit reference signals by its beams (e.g., transmission beams) in a plurality of predefined directions, such as the beams B01-B22. In some implementations, the beams B01-B22 may form a full beam pattern comprising all transmission beams supported by the network node 310.

Assuming that the beam B08 is the optimal beam (i.e., optimal transmission beam from the perspective of the network node) obtained or determined in the previous inference and the beam B07 is the beam in use (i.e., transmission beam in use from the perspective of the network node), in some implementations, the UE 320 or the network node 310 may densely or concentratedly select more beams close to the beam B08 or close to the beam B07 as a part of the beam pattern. The beams selected and configured for measurement may be allocated more densely or concentratedly along the direction of the previous inferred optimal beam (e.g., the beam B08) or the beam in use (e.g., the beam B07). In addition, in some implementations, the UE 320 or the network node 310 may sparsely select beams far away from the previous inferred optimal beam and/or the beam in use to reduce the selected beam number.

FIG. 3 also shows exemplary beam pattern 330 comprising the beams selected and configured for measurement (denoted as configured beam), where the configured beams are allocated densely or concentratedly along the direction of the previous inferred optimal beam or the beam in use and allocated sparsely along the direction far away from direction of the previous inferred optimal beam or the beam in use.

In some implementations, a confidence estimation of an inference may also be output by the AI/ML model (e.g., the beam prediction model) or may be obtained from the statistics or the state distribution of one or more internal nodes of the AI/ML model. The confidence estimation (e.g., confidence score) or the confidence level may also be utilized in beam selection. In some implementations, the UE or the network node may densely or concentratedly select more beams close to the optimal beam in the previous inference or close to the beam in use as a part of the beam pattern in an event that a confidence estimation of the optimal beam is higher than a predetermined threshold, where the predetermined threshold here may be a score or a value representing a sufficiently high confidence of the inference. With higher confidence of previous inference, the configured beams may be allocated more densely or concentratedly.

In some implementations, the UE or the network node may select orthogonal or uncorrelated beams in a direction far away from the optimal beam in the previous inference or the beam in use as a part of the beam pattern for increasing spatial diversity or sampling. Referring to the beam pattern 330 shown in FIG. 3, one or more of the configured beams B14, B18 and B22 may be the orthogonal beam or the uncorrelated beam in the direction far away from the optimal beam (e.g., the beam B08) or the beam in use (e.g., the beam B07). Such arrangement may help to space the configured beam sparsely or extend the coverage of the configured beam.

In some implementations, the UE or the network node may densely or concentratedly select more beams close to a direction with a received power (e.g., a measured reference signal received power (RSRP)) higher than a predetermined threshold as a part of the beam pattern, where the predetermined threshold here may be a value representing a sufficiently high received power for the UE.

Referring to FIG. 3, suppose that a direction with the highest received power or with a received power higher than the predetermined threshold is aligned with a radiation direction of the beam B07, the UE or the network node may densely or concentratedly select more beams close to the direction of the beam B07. Therefore, if the previous measured power with respect to or near certain directions or some beams are obviously larger than the others, the selected and/or configured beams may be arranged more concentrated or densely.

In some implementations, the UE or the network node may evenly select beams in a spatial domain as a part of the beam pattern in an event that a difference between received power measured in different directions in the spatial domain is less than a predetermined threshold, where the predetermined threshold here may be a value representing a sufficient difference in the received power.

Figure 4:
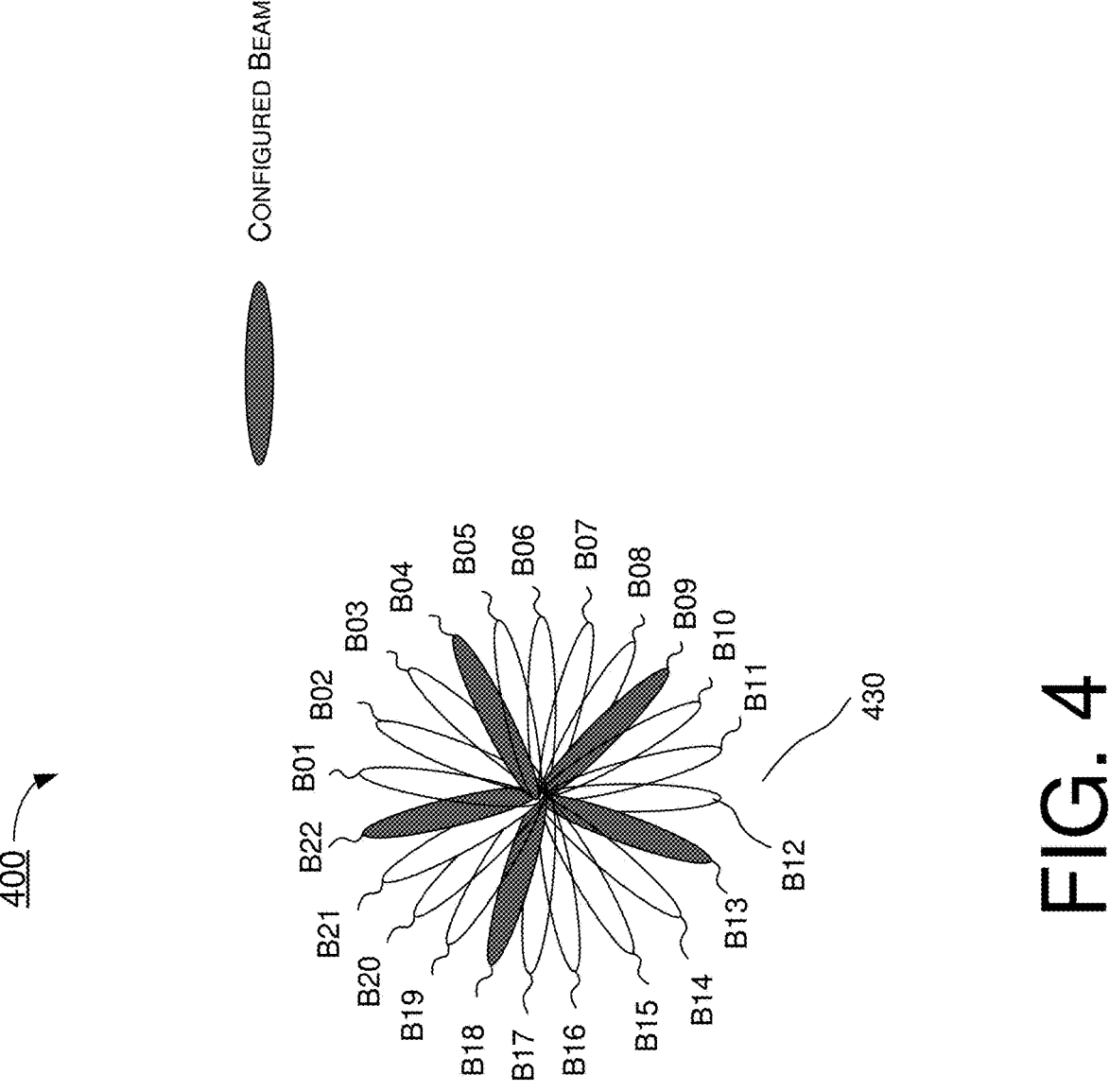
FIG. 4 is a diagram depicting an example scenario of multiple communication beams in accordance with implementations of the present disclosure.

FIG. 4 illustrates an example scenario 400 of multiple communication beams in accordance with implementations of the present disclosure. In an event that a difference between received power measured in different directions in the spatial domain is less than a predetermined threshold, as an example, when the previous RSRPs show little difference among various beams, the beam pattern 430 may comprise the beams, such as the beams B04, B09, B13, B18 and B22, distributed evenly in the spatial domain.

In some implementations, the UE or the network node may reduce a number of beams in the beam pattern in an event that an indicator value of a channel quality is better than a predetermined threshold, where the predetermined threshold here may be a value representing a satisfying or sufficiently good transmission condition or a satisfying or sufficiently good channel quality.

When the number of configured beams in the beam pattern is reduced (as an example, reduced from 7 (the number of configured beams in the beam pattern 330) to 4 or reduced from 5 (the number of configured beams in the beam pattern 430) to 3), the overhead and burden of the beam measurement may be reduced and efficient beam measurement may be achieved.

In addition, when the configured beams in the beam pattern are flexibly arranged (that is, not arranged based on a fixed or a static rule) based on at least one of the previous inferred optimal beam, the transmission beam in use, the measurement result obtained from the UE and the channel condition, the accuracy of beam prediction (e.g., the optimal beam determination) can be enhanced.

In some implementations, the aforementioned determining of the beam pattern (e.g., the beam selection 110 in FIG. 1) may be performed by an AI/ML model, and wherein the beam pattern may be obtained from an output of the AI/ML model. The efficiency and accuracy of the beam selection can be improved.

In some implementations, the UE, the network node or the AI/ML model implemented in the UE or the network node may dynamically adjust a determination rule or a determination basis for the determining of the beam pattern. The determination rule or the determination basis may comprise at least one of the aforementioned optimal beam in the previous inference, the beam in use, the previous measurement result and the condition of the channel. With dynamical rules or bases, the measurement overhead may be reduced while maintaining the performance, and the beam alignment may be conducted more precisely and efficiently.

In some implementations, as the determination rule or the determination basis being adjusted, the resulting beam pattern may be changed as well. Therefore, in some implementations, the UE or the network node may change the beam pattern based on the direction of the previous inferred optimal beam or the beam in use.

In some implementations, the UE or the network node may change the beam pattern based on the statistics of the AI/ML model internal nodes or output.

In some implementations, the UE or the network node may change the beam pattern based on the previous measurement result.

In some implementations, the UE or the network node may change the beam pattern based on the transmission condition (e.g., channel quality).

In some implementations, the UE may provide the determined beam pattern to the network node as a suggestion for beam configuration. The UE may receive a measurement configuration from the network node, wherein the measurement configuration may comprise information regarding one or more configured beams configured based on the beam pattern determined or suggested by the UE.

The UE may measure the configured beams to obtain a measurement result and provide the measurement result to the network node or to the AI/ML model for beam determination (e.g., the beam determination 130 in FIG. 1). In some implementations, the UE may provide the measurement result as an input of the AI/ML model and obtain an output of the AI/ML model as a new optimal beam of the current inference.

In some implementations, the network node may receive the measurement result of one or more transmission beams comprised in the beam pattern from the UE and provide the measurement result as an input of the AI/ML model. In some implementations, the network node may obtain an output of the AI/ML as a new optimal beam and configure the new optimal beam to the UE.

In some implementations, by flexibly adjusting the determination rule or the determination basis for the determining of the beam pattern, the measurement overhead may be reduced while maintaining the measurement performance and the accuracy of beam prediction (e.g., the optimal beam determination) is greatly improved. In this manner, the beam alignment is conducted more precisely.

Illustrative Implementations

Figure 5:
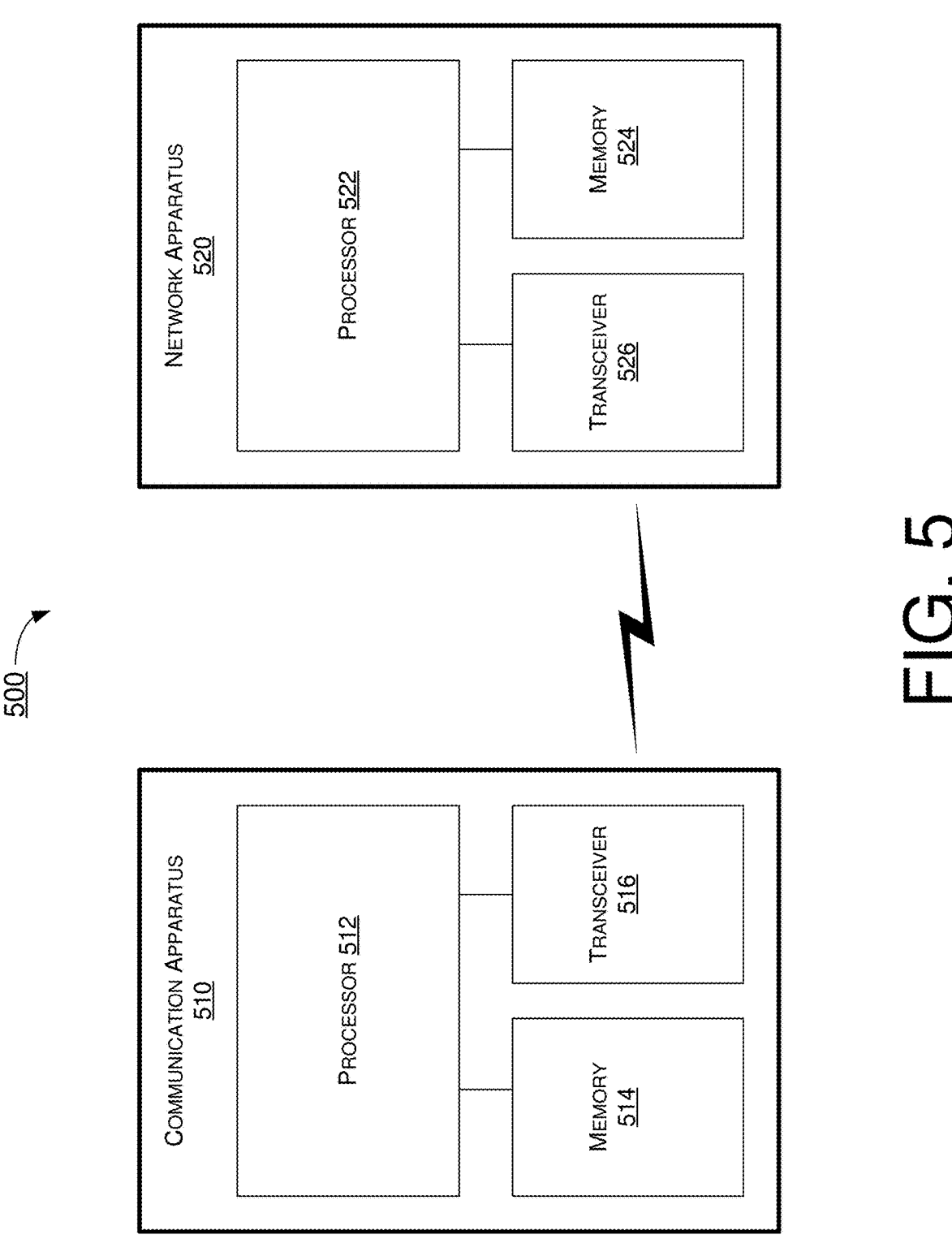
FIG. 5 is a diagram depicting an example communication system having an example communication apparatus and an example network apparatus in accordance with an implementation of the present disclosure.

FIG. 5 illustrates an example communication system 500 having an example communication apparatus 510 and an example network apparatus 520 in accordance with an implementation of the present disclosure. Each of the communication apparatus 510 and the network apparatus 520 may perform various functions to implement schemes, techniques, processes and methods described herein pertaining to beam selection with respect to the communication apparatus and the network apparatus in mobile communications to achieve efficient beam measurement and accurate beam determination (prediction) in the beam management procedure, including scenarios/schemes described above as well as the processes 600 and the process 700 described below.

Communication apparatus 510 may be a part of an electronic apparatus, which may be a UE such as a portable or mobile apparatus, a wearable apparatus, a wireless communication apparatus or a computing apparatus. For instance, the communication apparatus 510 may be implemented in a smartphone, a smartwatch, a personal digital assistant, a digital camera, or a computing equipment such as a tablet computer, a laptop computer or a notebook computer. The communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, the communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. The communication apparatus 510 may include at least some of those components shown in FIG. 5 such as a processor 512, for example. The communication apparatus 510 may further include one or more other components not pertinent to the proposed scheme of the present disclosure (e.g., internal power supply, display device and/or user interface device), and, thus, such component(s) of the communication apparatus 510 are neither shown in FIG. 5 nor described below in the interest of simplicity and brevity.

The network apparatus 520 may be a part of a network device, which may be a network node such as a satellite, a base station, a small cell, a router or a gateway. For instance, the network apparatus 520 may be implemented in an eNodeB in an LTE network, in a gNB in a 5G/NR, IoT, NB-IoT or IIoT network or in a satellite or base station in a 6G network. Alternatively, the network apparatus 520 may be implemented in the form of one or more IC chips such as, for example and without limitation, one or more single-core processors, one or more multi-core processors, or one or more RISC or CISC processors. The network apparatus 520 may include at least some of those components shown in FIG. 5 such as a processor 522, for example. The network apparatus 520 may further include one or more other components not pertinent to the proposed scheme of the present disclosure (e.g., internal power supply, display device and/or user interface device), and, thus, such component(s) of the network apparatus 520 are neither shown in FIG. 5 nor described below in the interest of simplicity and brevity.

In one aspect, each of the processor 512 and the processor 522 may be implemented in the form of one or more single-core processors, one or more multi-core processors, or one or more CISC processors. That is, even though a singular term "a processor" is used herein to refer to the processor 512 and the processor 522, each of the processor 512 and the processor 522 may include multiple processors in some implementations and a single processor in other implementations in accordance with the present disclosure. In another aspect, each of the processor 512 and the processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of the processor 512 and the processor 522 is a special-purpose machine specifically designed, arranged and configured to perform specific tasks including autonomous reliability enhancements in a device (e.g., as represented by communication apparatus 510) and a network (e.g., as represented by network apparatus 520) in accordance with various implementations of the present disclosure.

In some implementations, the communication apparatus 510 may also include a transceiver 516 coupled to the processor 512 and capable of wirelessly transmitting and receiving data. In some implementations, the communication apparatus 510 may further include a memory 514 coupled to the processor 512 and capable of being accessed by the processor 512 and storing data therein. In some implementations, the network apparatus 520 may also include a transceiver 526 coupled to the processor 522 and capable of wirelessly transmitting and receiving data. In some implementations, the network apparatus 520 may have a plurality of physical antennas which associates with a plurality of antenna ports. In some implementations, the network apparatus 520 may further include a memory 524 coupled to processor 522 and capable of being accessed by the processor 522 and storing data therein. Accordingly, communication apparatus 510 and the network apparatus 520 may wirelessly communicate with each other via the transceiver 516 and the transceiver 526, respectively. To aid better understanding, the following description of the operations, functionalities and capabilities of each of the communication apparatus 510 and the network apparatus 520 is provided in the context of a mobile communication environment in which the communication apparatus 510 is implemented in or as an apparatus or a UE and the network apparatus 520 is implemented in or as a network node or a network device of a communication network.

In some implementations, the processor 512 of the communication apparatus 510 may determine a beam pattern according to at least one of an optimal beam in a previous inference, a beam in use, a previous measurement result and a condition of a channel between the communication apparatus 510 and a network node, such as the network apparatus 520, and provide, via the transceiver 516, information regarding the beam pattern to the network node.

In some implementations, in the determining of the beam pattern, the processor 512 may densely select beams close to the optimal beam in the previous inference or close to the beam in use as a part of the beam pattern.

In some implementations, in the selecting of the beams, the processor 512 may densely select more beams close to the optimal beam in the previous inference or close to the beam in use as a part of the beam pattern in an event that a confidence estimation of the optimal beam is higher than a predetermined threshold.

In some implementations, in the determining of the beam pattern, the processor 512 may select orthogonal or uncorrelated beams in a direction far away from the optimal beam in the previous inference or the beam in use as a part of the beam pattern.

In some implementations, in the determining of the beam pattern, the processor 512 may concentratedly select more beams close to a direction with a received power higher than a predetermined threshold as a part of the beam pattern.

In some implementations, in the determining of the beam pattern, the processor 512 may evenly select beams in a spatial domain as a part of the beam pattern in an event that a difference between received power measured in different directions in the spatial domain is less than a predetermined threshold.

In some implementations, in the determining of the beam pattern, the processor 512 may reduce a number of beams in the beam pattern in an event that an indicator value of a channel quality is better than a predetermined threshold.

In some implementations, the processor 512 may dynamically adjust a determination basis for the determining of the beam pattern, wherein the determination basis may comprise at least one of the optimal beam in the previous inference, the beam in use, the previous measurement result and the condition of the channel.

In some implementations, the processor 512 may receive, via the transceiver 516, a measurement configuration from the network node, wherein the measurement configuration may comprise information regarding one or more configured beams configured based on the beam pattern. In some implementations, the processor 512 may measure the configured beams to obtain a measurement result.

In some implementations, the processor 512 may provide the measurement result as an input of an AI/ML model and obtain an output of the AI/ML model as one or more new optimal beams.

In some implementations, the AI/ML model may be implemented either in the communication apparatus 510 or in the network apparatus 520.

In some implementations, the determining of the beam pattern may be performed by an AI/ML model, and wherein the beam pattern may be obtained from an output of the AI/ML model.

In some implementations, the processor 522 of the network apparatus 520 may determine a beam pattern according to at least one of an optimal beam in a previous inference, a transmission beam in use, a measurement result obtained from a UE (such as the communication apparatus 510) and a condition of a channel between the network apparatus 520 and the UE, and transmitting, via the transceiver 526, a measurement configuration comprising information regarding the beam pattern to the UE.

In some implementations, in the determining of the beam pattern, the processor 522 may densely select transmission beams close to the optimal beam in the previous inference or close to the transmission beam in use as a part of the beam pattern.

In some implementations, in the selecting of the beams, the processor 522 may densely select more transmission beams close to the optimal beam in the previous inference or close to the transmission beam in use as a part of the beam pattern in an event that a confidence estimation of the optimal beam is higher than a predetermined threshold.

In some implementations, in the determining of the beam pattern, the processor 522 may select orthogonal or uncorrelated transmission beams in a direction far away from the optimal beam in the previous inference or the transmission beam in use as a part of the beam pattern.

In some implementations, in the determining of the beam pattern, the processor 522 may concentratedly select more transmission beams close to a direction with a measured power higher than a predetermined threshold as a part of the beam pattern.

In some implementations, in the determining of the beam pattern, the processor 522 may evenly select transmission beams in a spatial domain as a part of the beam pattern in an event that a difference between received power measured in different directions in the spatial domain is less than a predetermined threshold.

In some implementations, in the determining of the beam pattern, the processor 522 may reduce a number of transmission beams in the beam pattern in an event that an indicator value of a channel quality is better than a predetermined threshold.

In some implementations, the processor 522 may dynamically adjust a determination basis for the determining of the beam pattern, wherein the determination basis may comprise at least one of the optimal beam in the previous inference, the transmission beam in use, the measurement result obtained from the UE and the condition of the channel.

In some implementations, the processor 522 may receive, via the transceiver 526, a measurement result of one or more transmission beams comprised in the beam pattern from the UE and provide the measurement result as an input of an AI/ML model.

In some implementations, the processor 522 may obtain an output of the AI/ML model as one or more new optimal beams and configure the one or more new optimal beams to the UE.

In some implementations, the AI/ML model may be implemented either in the communication apparatus 510 or in the network apparatus 520.

In some implementations, the determining of the beam pattern may be performed by an AI/ML model, and wherein the beam pattern may be obtained from an output of the AI/ML model.

Illustrative Processes

Figure 6:
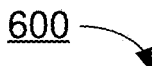
FIG. 6 is a diagram depicting an example process in accordance with an implementation of the present disclosure.

FIG. 6 illustrates an example process 600 in accordance with an implementation of the present disclosure. The process 600 may be an example implementation of above scenarios/schemes, whether partially or completely, with respect to beam selection in mobile communication in accordance with the present disclosure. Process 600 may represent an aspect of implementation of features of the communication apparatus 510. The process 600 may include one or more operations, actions, or functions as illustrated by one or more of blocks 610 and 620. Although illustrated as discrete blocks, various blocks of the process 600 may be divided into additional blocks, combined into fewer blocks, or eliminated, depending on the desired implementation. Moreover, the blocks of the process 600 may be executed in the order shown in FIG. 6 or, alternatively, in a different order. The process 600 may be implemented by the communication apparatus 510 or any suitable UE or machine type devices. Solely for illustrative purposes and without limitation, process 600 is described below in the context of the communication apparatus 510. The process 600 may begin at block 610.

At 610, process 600 may involve the processor 512 of the communication apparatus 510 determining a beam pattern according to at least one of an optimal beam in a previous inference, a beam in use, a previous measurement result and a condition of a channel between the communication apparatus 510 and a network node, such as the network apparatus 520. The process 600 may proceed from 610 to 620.

At 620, the process 600 may involve processor 512 providing information regarding the beam pattern to the network node.

In some implementations, at 610, the process 600 may involve the processor 512 densely selecting beams close to the optimal beam in the previous inference or close to the beam in use as a part of the beam pattern.

In some implementations, at 610, the process 600 may involve the processor 512 densely selecting more beams close to the optimal beam in the previous inference or close to the beam in use as a part of the beam pattern in an event that a confidence estimation of the optimal beam is higher than a predetermined threshold.

In some implementations, at 610, the process 600 may involve the processor 512 selecting orthogonal or uncorrelated beams in a direction far away from the optimal beam in the previous inference or the beam in use as a part of the beam pattern.

In some implementations, at 610, the process 600 may involve the processor 512 concentratedly selecting more beams close to a direction with a received power higher than a predetermined threshold as a part of the beam pattern.

In some implementations, at 610, the process 600 may involve the processor 512 evenly selecting beams in a spatial domain as a part of the beam pattern in an event that a difference between received power measured in different directions in the spatial domain is less than a predetermined threshold.

In some implementations, at 610, the process 600 may involve the processor 512 reducing a number of beams in the beam pattern in an event that an indicator value of a channel quality is better than a predetermined threshold.

In some implementations, the process 600 may involve the processor 512 dynamically adjusting a determination basis for the determining of the beam pattern, wherein determination basis comprises at least one of the optimal beam in the previous inference, the beam in use, the previous measurement result and the condition of the channel.

In some implementations, the process 600 may involve the processor 512 receiving a measurement configuration from the network node, wherein the measurement configuration comprises information regarding one or more configured beams configured based on the beam pattern, and measuring the configured beams to obtain a measurement result.

In some implementations, the process 600 may involve the processor 512 providing the measurement result as an input of an AI/ML model and obtaining an output of the AI/ML model as one or more new optimal beams.

In some implementations, the AI/ML model may be implemented either in the communication apparatus 510 or in the network apparatus 520.

FIG. 7 depicting an example process 700 in accordance with an implementation of the present disclosure. The process 700 may be an example implementation of above scenarios/schemes, whether partially or completely, with respect to beam selection in mobile communication in accordance with the present disclosure. The process 700 may represent an aspect of implementation of features of the network apparatus 520. The process 700 may include one or more operations, actions, or functions as illustrated by one or more of blocks 710 and 720. Although illustrated as discrete blocks, various blocks of the process 700 may be divided into additional blocks, combined into fewer blocks, or eliminated, depending on the desired implementation. Moreover, the blocks of the process 700 may be executed in the order shown in FIG. 7 or, alternatively, in a different order. The process 700 may be implemented by the network apparatus 520 or any suitable network device or network node. Solely for illustrative purposes and without limitation, the process 700 is described below in the context of the network apparatus 520. The process 700 may begin at block 710.

At 710, the process 700 may involve the processor 522 of the network apparatus 520 determining a beam pattern according to at least one of an optimal beam in a previous inference, a transmission beam in use, a measurement result obtained from a user equipment (UE) and a condition of a channel between the apparatus and the UE. The process 700 may proceed from 710 to 720.

At 720, the process 700 may involve the processor 522 transmitting a measurement configuration comprising information regarding the beam pattern to the UE.

In some implementations, at 710, the process 700 may involve the processor 522 densely selecting transmission beams close to the optimal beam in the previous inference or close to the transmission beam in use as a part of the beam pattern.

In some implementations, at 710, the process 700 may involve the processor 522 densely selecting more transmission beams close to the optimal beam in the previous inference or close to the transmission beam in use as a part of the beam pattern in an event that a confidence estimation of the optimal beam is higher than a predetermined threshold.

In some implementations, at 710, the process 700 may involve the processor 522 selecting orthogonal or uncorrelated transmission beams in a direction far away from the optimal beam in the previous inference or the transmission beam in use as a part of the beam pattern.

In some implementations, at 710, the process 700 may involve the processor 522 concentratedly selecting more transmission beams close to a direction with a measured power higher than a predetermined threshold as a part of the beam pattern.

In some implementations, at 710, the process 700 may involve the processor 522 evenly selecting transmission beams in a spatial domain as a part of the beam pattern in an event that a difference between received power measured in different directions in the spatial domain is less than a predetermined threshold.

In some implementations, at 710, the process 700 may involve the processor 522 reducing a number of transmission beams in the beam pattern in an event that an indicator value of a channel quality is better than a predetermined threshold.

In some implementations, the process 700 may involve the processor 522 dynamically adjusting a determination basis for the determining of the beam pattern, wherein the determination basis comprises at least one of the optimal beam in the previous inference, the transmission beam in use, the measurement result obtained from the UE and the condition of the channel.

In some implementations, the process 700 may involve the processor 522 receiving a measurement result of one or more transmission beams comprised in the beam pattern from the UE and providing the measurement result as an input of an AI/ML model.

In some implementations, the process 700 may involve the processor 522 obtaining an output of the AI/ML model as one or more new optimal beams and configuring the new optimal beam to the UE.

In some implementations, the AI/ML model may be implemented either in the communication apparatus 510 or in the network apparatus 520.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of an apparatus, a beam pattern according to at least one of an optimal beam in a previous inference, a beam in use, a previous measurement result and a condition of a channel between the apparatus and a network node;

providing, by the processor, information regarding the beam pattern to the network node;

receiving, by the processor, a measurement configuration from the network node, wherein the measurement configuration comprises information regarding one or more configured beams configured based on the beam pattern;

measuring, by the processor, the configured beams to obtain a measurement result;

providing, by the processor, the measurement result as an input of an artificial intelligence or machine learning model; and obtaining, by the processor, an output of the artificial intelligence or machine learning model as one or more new optimal beams, wherein the determining of the beam pattern further comprises selecting more beams close to the optimal beam in the previous inference or close to the beam in use as a part of the beam pattern in an event that a confidence estimation of the optimal beam is higher than a predetermined threshold.

2. The method of claim 1, wherein the determining of the beam pattern further comprises:

selecting orthogonal or uncorrelated beams in a direction far away from the optimal beam in the previous inference or the beam in use as a part of the beam pattern.

3. The method of claim 1, wherein the determining of the beam pattern further comprises:

concentratedly selecting more beams close to a direction with a received power higher than a predetermined threshold as a part of the beam pattern.

4. The method of claim 1, wherein the determining of the beam pattern further comprises:

evenly selecting beams in a spatial domain as a part of the beam pattern in an event that a difference between received power measured in different directions in the spatial domain is less than a predetermined threshold.

5. The method of claim 1, wherein the determining of the beam pattern further comprises:

reducing a number of beams in the beam pattern in an event that an indicator value of a channel quality is better than a predetermined threshold.

6. The method of claim 1, further comprising:

dynamically adjusting, by the processor, a determination basis for the determining of the beam pattern, wherein the determination basis comprises at least one of the optimal beam in the previous inference, the beam in use, the previous measurement result and the condition of the channel.

7. A method, comprising:

determining, by a processor of an apparatus, a beam pattern according to at least one of an optimal beam in a previous inference, a transmission beam in use, a measurement result obtained from a user equipment (UE) and a condition of a channel between the apparatus and the UE;

transmitting, by the processor, a measurement configuration comprising information regarding the beam pattern to the UE; receiving, by the processor, a measurement result of one or more transmission beams comprised in the beam pattern from the UE;

providing, by the processor, the measurement result as an input of an artificial intelligence or machine learning model; obtaining, by the processor, an output of the artificial intelligence or learning model as one or more new optimal beams; and configuring, by the processor, the one or more new optimal beams to the UE, wherein the determining of the beam pattern further comprises selecting more transmission beams close to the optimal beam in the previous inference or close to the transmission beam in use as a part of the beam pattern in an event that a confidence estimation of the optimal beam is higher than a predetermined threshold.

8. The method of claim 7, wherein the determining of the beam pattern further comprises:

selecting orthogonal or uncorrelated transmission beams in a direction far away from the optimal beam in the previous inference or the transmission beam in use as a part of the beam pattern.

9. The method of claim 7, wherein the determining of the beam pattern further comprises:

concentratedly selecting more transmission beams close to a direction with a measured power higher than a predetermined threshold as a part of the beam pattern.

10. The method of claim 7, wherein the determining of the beam pattern further comprises:

evenly selecting transmission beams in a spatial domain as a part of the beam pattern in an event that a difference between received power measured in different directions in the spatial domain is less than a predetermined threshold.

11. The method of claim 7, wherein the determining of the beam pattern further comprises:

reducing a number of transmission beams in the beam pattern in an event that an indicator value of a channel quality is better than a predetermined threshold.

12. The method of claim 7, further comprising:

dynamically adjusting, by the processor, a determination basis for the determining of the beam pattern, wherein the determination basis comprises at least one of the optimal beam in the previous inference, the transmission beam in use, the measurement result obtained from the UE and the condition of the channel.

* * * * *